UNITED STATES PATENT OFFICE.

WILLIAM R. WALTON, OF ANSONIA, CONNECTICUT, ASSIGNOR TO THE ANSONIA BRASS AND COPPER COMPANY, OF SAME PLACE.

PROCESS OF REFINING OR PREPARING COPPER FOR CASTING.

SPECIFICATION forming part of Letters Patent No. 324,505, dated August 18, 1885.

Application filed December 22, 1884. (No specimens.)

*To all whom it may concern:*

Be it known that I, WILLIAM ROBERT WALTON, a citizen of Great Britain, residing at Ansonia, in the county of New Haven and State of Connecticut, have invented an Improvement in Processes of Refining or Preparing Copper for Casting, of which the following is a specification.

In casting ingots of copper, especially those that are tubular for seamless tubes, rollers, &c., great difficulty has heretofore been experienced in obtaining sufficient solidity, and in preventing the copper becoming brittle.

Copper that is being refined is subjected to what is known as the "poling," which is a stirring operation by a green pole, the effect of which is to produce a violent ebullition of the copper, and the carbon of the wood appears to combine with the oxygen in the copper sufficiently to render the cast metal solid and malleable. This poling operation cannot be performed to advantage in remelting in crucibles on account of the ebullition.

My present invention is for treating copper in crucibles, so as to exclude the action of the atmosphere and subject the copper to the action of carbon sufficiently to remove the oxygen and render such copper solid when cast, and increase its malleability and ductility. I take about eight pounds of zinc, either in the form of an oxide or carbonate, and mix it with one bushel of ground charcoal, wet it and make it into a stiff paste, portion it out, say, into twenty-four parts, and make it into rough balls, and dry in a moderate heat. The copper is placed in the crucible in the furnace, and when on the point of melting one of the balls is dropped upon the copper, and it gradually falls in pieces and covers the copper as it melts down, thereby entirely excluding the atmosphere from the surface of the copper. At the same time the zinc in the mass is evolved, and dispels any oxygen which may remain in the crucible. It may be supposed that the oxide of zinc will impregnate the copper; but such is not the case. The charcoal coming in contact with the copper, and the oxide of zinc being volatile under the action of the heat, no combination with the copper takes place, and the zinc is volatilized and carried off through the flue, while the charcoal remains on the surface of the copper and combines with any excess of oxygen and burns, and at the same time the carbon combines with the copper sufficiently to cause it to remain solid when cast. Copper treated in this way becomes perfectly malleable and is thoroughly toughened, and is in fact improved by this treatment. My improvement is especially available when the copper is melted in a crucible; but it may be used when melted on a hearth or otherwise. The impurities of common copper are thrown to the surface in a slag, and the copper made so that it will work better either hot or cold, and stand a greater test for either tension or ductility.

The above method of treatment can be applied to copper that is to be used in the manufacture of any article. Copper so treated will remain in a very liquid state much longer than that treated in the ordinary manner; and the copper can also be brought to a very great heat without becoming decarbonized and losing its toughness.

When casting such articles as tubes or small or thin castings a little phosphorus, added just before pouring, assists very materially in keeping the metal in a liquid state, and also prevents the absorption of oxygen from the atmosphere while cooling in the molds.

I am aware that it is old to refine copper by adding metallic zinc to the charge of metal protected by a layer of charcoal, for the purpose of toughening and purifying the same; but in such treatment the zinc itself cannot be mixed with the carbon as intimately and uniformly as the carbonate or the oxide, and hence the action on the copper will not be as thorough and reliable; besides this, the zinc, when used in a metallic state, melts before being vaporized, and in its melted condition it combines with the copper, which is detrimental. By my improvement the oxide or the carbonate cannot combine with the copper, hence the risk of an alloy is lessened.

I claim as my invention—

The process herein specified of treating copper to promote the density, malleability, and ductility of the metal when cast, consisting in melting such copper and adding upon the surface of the metal as it melts carbon mixed with zinc in the form of an oxide or carbonate, substantially as set forth.

Signed by me this 15th day of December, A. D. 1884.

WILLIAM R. WALTON.

Witnesses:
A. S. TERRY,
JOHN W. DREW.